US010145439B2

(12) United States Patent
Rummel (10) Patent No.: US 10,145,439 B2
(45) Date of Patent: *Dec. 4, 2018

(54) VARIABLE RADIUS SPRING DISC FOR VEHICLE SHOCK ABSORBER

(71) Applicant: Tenneco Automotive Operating Company Inc., Lake Forest, IL (US)

(72) Inventor: Chad Rummel, Grass Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/402,813

(22) Filed: Jan. 10, 2017

(65) Prior Publication Data

US 2017/0146088 A1 May 25, 2017

Related U.S. Application Data

(63) Continuation of application No. 14/716,048, filed on May 19, 2015, now Pat. No. 9,587,703.

(60) Provisional application No. 62/000,990, filed on May 20, 2014.

(51) Int. Cl.
*F16F 9/348* (2006.01)
*F16F 9/34* (2006.01)
*B60G 13/08* (2006.01)

(52) U.S. Cl.
CPC ............ *F16F 9/3484* (2013.01); *B60G 13/08* (2013.01); *F16F 9/34* (2013.01); *F16F 9/3482* (2013.01); *F16F 9/3488* (2013.01); *B60G 2500/114* (2013.01)

(58) Field of Classification Search
CPC .. F16F 9/34; F16F 9/348; F16F 9/3484; F16F 9/3487; F16F 9/3488; F16F 9/3482; F16F 1/32; F16F 1/324; F16F 1/326; F16F 1/36; F16K 11/0743
See application file for complete search history.

(56) References Cited

U.S. PATENT DOCUMENTS

| 5,154,263 A | 10/1992 | Lizell | |
|---|---|---|---|
| 5,332,069 A * | 7/1994 | Murakami | ............ F16F 9/3484 188/282.6 |
| 5,497,862 A | 3/1996 | Hoya | |

(Continued)

FOREIGN PATENT DOCUMENTS

| CN | 103291823 | 9/2013 |
|---|---|---|
| JP | 2013190011 A | 9/2013 |

*Primary Examiner* — Vishal R Sahni
(74) *Attorney, Agent, or Firm* — Harness, Dickey & Pierce, P.L.C.

(57) ABSTRACT

A shock absorber for a vehicle is disclosed which has a pressure tube defining a fluid chamber, a piston rod, and a piston disposed within the fluid chamber, and carried on the piston rod, which divides the fluid chamber into upper and lower working chambers, and which has a plurality of passages extending between the upper and lower working chambers. A valve disc assembly controls a flow of fluid, and includes a spring disc. The spring disc has a non-symmetrical circumferential shape which enables a stiffness of the valve disc assembly to be tailored so that it begins to open at a first peripheral point, and continuously gradually opens about a non-symmetrical circumferential path until reaching a second peripheral point adjacent the first peripheral point.

9 Claims, 7 Drawing Sheets

(56) References Cited

U.S. PATENT DOCUMENTS

| | | | |
|---|---|---|---|
| 5,529,154 A | 6/1996 | Tanaka | |
| 6,655,512 B2* | 12/2003 | Moradmand | F16F 9/348 188/282.5 |
| 6,672,436 B1 | 1/2004 | Keil et al. | |
| 8,820,495 B2 | 9/2014 | King | |
| 9,587,703 B2* | 3/2017 | Rummel | F16F 9/3482 |
| 2003/0094342 A1* | 5/2003 | Dodge | F16F 9/062 188/322.13 |
| 2008/0149438 A1 | 6/2008 | Chikamatsu et al. | |
| 2009/0057079 A1* | 3/2009 | Vanbrabant | F16F 9/3488 188/313 |
| 2009/0260938 A1* | 10/2009 | Hikosaka | F16F 9/3484 188/322.15 |
| 2009/0294232 A1 | 12/2009 | Ashiba | |
| 2013/0025446 A1* | 1/2013 | Ashiba | F16F 9/3485 91/418 |
| 2014/0060985 A1 | 3/2014 | Oshie et al. | |

\* cited by examiner

VARIABLE RADIUS SPRING DISC FOR VEHICLE SHOCK ABSORBER

CROSS-REFERENCE TO RELATED APPLICATIONS

This application in a continuation of U.S. application Ser. No. 14/716,048, filed May 19, 2015, which in turn claims the benefit of U.S. Provisional Application No. 62/000,990, filed on May 20, 2014. The entire disclosures of the above applications are incorporated herein by reference.

FIELD

The present disclosure relates to shock absorbers. More particularly, the present disclosure relates to a valve disc assembly for controlling damping characteristics of a shock absorber.

BACKGROUND

This section provides background information related to the present disclosure which is not necessarily prior art.

Shock absorbers are used in conjunction with automotive suspension systems to absorb unwanted vibrations that occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod which extends through the pressure tube.

The piston divides the pressure tube into an upper working chamber and a lower working chamber, both of which are filled with hydraulic fluid. Through valving, the piston is able to limit the flow of the hydraulic fluid between the upper and the lower working chambers when the shock absorber is compressed or extended. Accordingly, the shock absorber is able to produce a damping force that counteracts the vibration which would otherwise be transmitted from the unsprung portion to the sprung portion of the vehicle. In a dual tube shock absorber, a fluid reservoir or reservoir chamber is defined between the pressure tube and a reservoir tube. A base valve is located between the lower working chamber and the reservoir chamber to control the flow of fluid between the lower working chamber and the reservoir chamber.

Shock absorbers have been developed to provide different damping characteristics depending on the speed or acceleration of the piston within the pressure tube. Because of the exponential relationship between pressure drop and flow rate, it can be difficult to tune the damping characteristic of the shock absorber between low and high piston speeds. Specifically, the valving at the piston and/or base valve is designed to close/open in one unilateral movement, thereby causing an abrupt change in damping between low and high piston speeds.

SUMMARY

This section provides a general summary of the disclosure, and is not a comprehensive disclosure of its full scope or all of its features.

In one aspect the present disclosure relates to A shock absorber for a vehicle comprising a pressure tube defining a fluid chamber, a piston rod disposed within the pressure tube, and a piston disposed within the fluid chamber and carried on the piston rod. The piston divides the fluid chamber into an upper working chamber and a lower working chamber, and defines a plurality of passages extending through the piston between the upper working chamber and the lower working chamber. A valve disc assembly is included for controlling a flow of fluid within the shock absorber. The valve disc assembly is disposed within the pressure tube and includes a spring disc. The spring disc has a non-symmetrical shape which enables a stiffness of the valve disc assembly to be tailored so that the valve disc assembly begins to open at a first peripheral point, and continuously gradually opens about a non-symmetrical circumferential path defined by a periphery of the spring disc, until reaching a second peripheral point adjacent the first peripheral point.

In another aspect the present disclosure relates to a shock absorber for a vehicle comprising a pressure tube defining a fluid chamber, a piston rod disposed within the pressure tube, and piston disposed within the fluid chamber and carried on the piston rod. The piston divides the fluid chamber into an upper working chamber and a lower working chamber, and further defines a plurality of passages extending through the piston between the upper working chamber and the lower working chamber. A valve disc assembly is included for controlling a flow of fluid within the shock absorber. The valve disc assembly includes a spring disc. The valve disc assembly is disposed within the pressure tube and cooperates with a land of a flow control component to control a fluid flow within the shock absorber. In particular, the valve disc assembly cooperates with the land to control opening of the valve disc assembly so that the valve disc assembly begins to open at a first peripheral point, and gradually continuously opens about a non-symmetrical circumferential path, until reaching a second peripheral point adjacent the first peripheral point.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
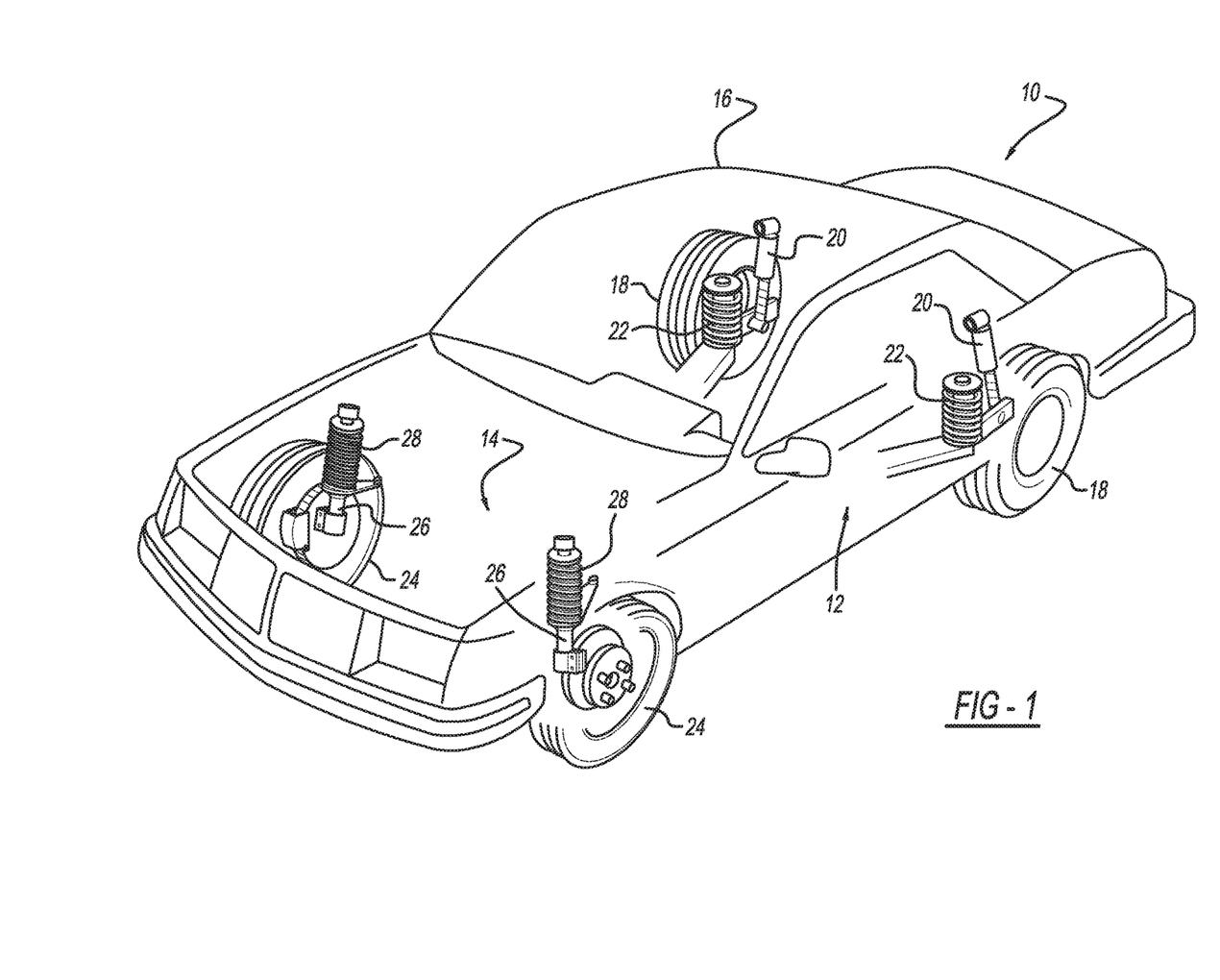
FIG. 1 is a schematic representation of a typical automobile that incorporates at least one shock absorber.

The present disclosure will now be described more fully with reference to the accompanying drawings. Referring now to the drawings in which like reference numerals designate like or corresponding parts throughout the several views, FIG. 1 illustrates a vehicle 10 incorporating a suspension system with shock absorbers having a variable radius spring disc in accordance with the present disclosure. The vehicle 10 includes a rear suspension 12, a front suspension 14, and a body 16. The rear suspension 12 has a transversely extending rear axle assembly (not shown) adapted to operatively support the vehicle's rear wheels 18. The rear axle assembly is operatively connected to the body 16 by means of a pair of shock absorbers 20 and a pair of helical coil springs 22. Similarly, the front suspension 14 includes a transversely extending front axle assembly (not shown) to operatively support the vehicle's front wheels 24. The front axle assembly is operatively connected to the body 16 by means of a second pair of shock absorbers 26 and by a pair of helical coil springs 28.

The shock absorbers 20 and 26 serve to dampen the relative motion of the unsprung portion (i.e., the front and rear suspensions 12 and 14, respectively) and the sprung portion (i.e., the body 16) of the vehicle 10. While the vehicle 10 has been depicted as a passenger car having front and rear axle assemblies, the shock absorbers 20 and 26 may be used with other types of vehicles or in other types of applications including, but not limited to, vehicles incorporating independent front and/or independent rear suspension systems.

Figure 2:
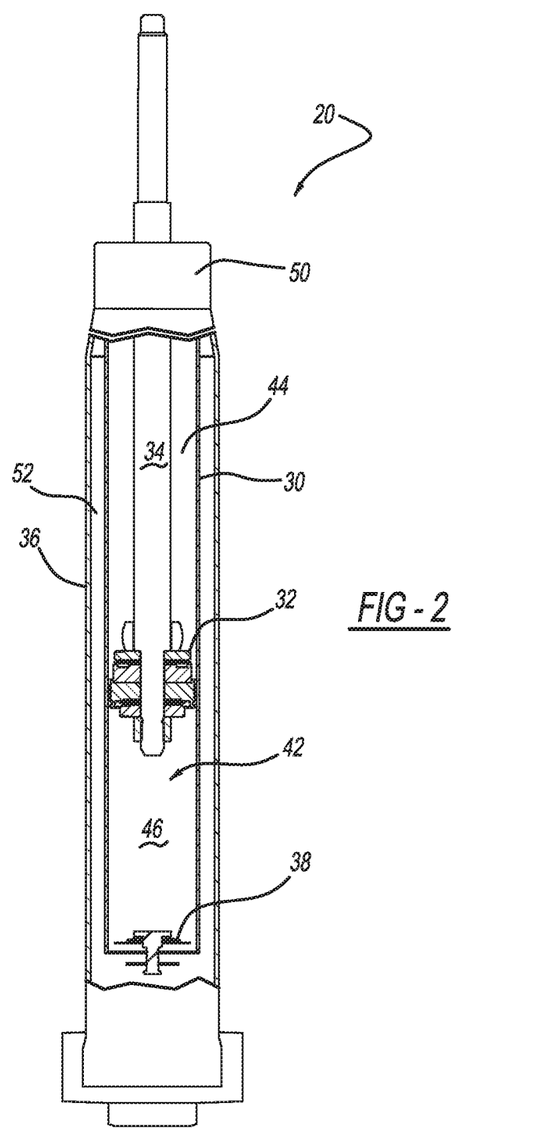
FIG. 2 is a side partial cross-sectional view of a shock absorber.

Referring now to FIG. 2, the shock absorber 20 is shown in greater detail. While FIG. 2 illustrates only shock absorber 20, it is to be understood that the shock absorber 26 includes the same components as the shock absorber 20. The shock, absorber 26 only differs from the shock absorber 20 in the manner in which it is adapted to be connected to the sprung and unsprung portions of the vehicle 10. Furthermore, while the shock absorber 20 is depicted as a dual-tube shock absorber, shock absorber 20 may also be a mono-tube shock absorber.

Figure 3:
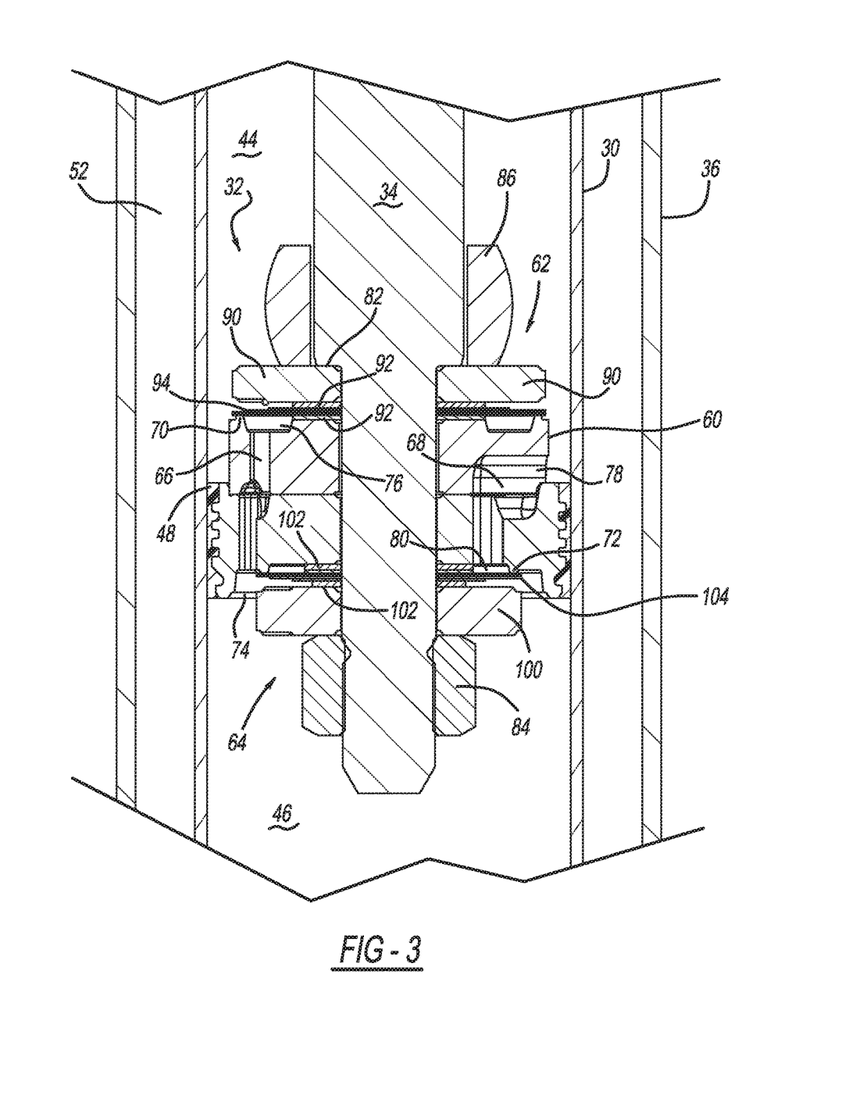
FIG. 3 is an enlarged cross-sectional view of a piston assembly of the shock absorber.

The shock absorber 20 comprises a pressure tube 30, a piston assembly 32, a piston rod 34, a reservoir tube 36, and a base valve assembly 38. The pressure tube 30 defines a working chamber 42. The piston assembly 32 is slidably disposed within the pressure tube 30, and divides the working chamber 42 into an upper working chamber 44 and a lower working chamber 46. A seal 48, which is shown in FIG. 3, is disposed between the piston assembly 32 and the pressure tube 30 to permit sliding movement of the piston assembly 32 with respect to the pressure tube 30 without generating undue frictional forces as well as sealing the upper working chamber 44 from the lower working chamber 46.

The piston rod 34 is attached to the piston assembly 32 and extends through the upper working chamber 44 and through an upper end cap 50 which closes the upper end of pressure tube 30. The end of the piston rod 34 opposite to the piston assembly 32 is adapted to be secured to the sprung portion of vehicle 10.

Valving within the piston assembly 32 controls the movement of fluid between the upper working chamber 44 and the lower working chamber 46 during movement of the piston assembly 32 within the pressure tube 30. Because the piston rod 34 extends only through the upper working chamber 44 and not the lower working chamber 46, movement of the piston assembly 32 with respect to the pressure tube 30 causes a difference in the amount of fluid displaced in the upper working chamber 44 and the amount of fluid displaced in the lower working chamber 46. The difference in the amount of fluid displaced flows through the base valve assembly 38, the piston assembly 32, or a combination thereof.

The reservoir tube 36 surrounds the pressure tube 30 to define a fluid reservoir chamber 52 located between the tubes 30 and 36. The base valve assembly 38 is disposed between the lower working chamber 46 and the reservoir chamber 52 to control the flow of fluid between the chambers 46 and 52. When the shock absorber 20 extends in length, fluid will flow from the reservoir chamber 52 to the lower working chamber 46 through the base valve assembly 38. Fluid may also flow from the upper working chamber 44 to the lower working chamber 46 through the piston assembly 32. When the shock absorber 20 compresses in length, an excess of fluid is removed from the lower working chamber 46. Specifically, fluid flows from the lower working chamber 46 to the reservoir chamber 52 through the base valve assembly 38.

Referring now to FIG. 3, the piston assembly 32 comprises a piston body 60, a compression valve assembly 62, and a rebound valve assembly 64. The piston body 60 defines a plurality of compression fluid passages 66 and a plurality of rebound fluid passages 68, and includes a compression valve land 70 and a rebound valve land 72. The compression fluid passages 66 include an inlet 74 and an outlet 76. The rebound fluid passages 68 include an inlet 78 and an outlet 80. The compression fluid passages 66 and the rebound fluid passages 68 fluidly couple the upper working chamber 44 and the lower working chamber 46.

The piston body 60 abuts with the compression valve assembly 62, which abuts with a shoulder 82 formed on the piston rod 34. The piston body 60 also abuts with the rebound valve assembly 64, which is retained by a retaining nut 84. The retaining nut 84 and a retaining nut 84 secure piston body 60 and valve assemblies 62 and 64 to piston rod 34.

The compression valve assembly 62 includes a retainer 90, one or more spacers 92, and a valve disc assembly 94. The retainer 90 is disposed above the piston body 60 and abuts with the shoulder 82. The spacers 92 are disposed between the valve disc assembly 94 and the retainer 90 and between the valve disc assembly 94 and the piston body 60. The valve disc assembly 94 abuts with the compression valve land 70 and closes the outlet 76 of the compression fluid passages 66.

The rebound valve assembly 64 also includes a retainer 100, one or more spacers 102, and a valve disc assembly 104. The retainer 100 is disposed below the piston body 60 and abuts with the retaining nut 84. The spacers 102 are disposed between the valve disc assembly 104 and the retaining nut 84 and between the valve disc assembly 104 and the piston body 60. The valve disc assembly 104 abuts with the rebound valve land 72 and closes the outlet 80 of rebound fluid passages 68.

In the example embodiment, the damping characteristics for both rebound (extension) and compression for the shock absorber 20 are determined by the piston assembly. More particularly, the piston assembly 32 is provided as a fully displaced valving that includes valving for mid/high fluid speeds and an independent valving for low piston speeds (i.e., low hydraulic fluid flow or low fluid speed). During mid/high level speed, damping is controlled by the deflection of the valve disc assembly 94 of the compression valve assembly 62 and the valve disc assembly 104 of the rebound valve assembly 64. During low level speeds, damping is controlled by bleed passages.

In an alternative embodiment, the damping characteristics for rebound and compression of the shock absorber 20 can be determined by a combination of a piston assembly and a base valve assembly. More particularly, in a rod displaced valving, the base valve assembly may include a plurality of discs that control the flow fluid between the reservoir chamber and the lower working chamber. For example, during mid/high piston speed, damping can be controlled by the base valve assembly and valving at the piston. At low piston speeds, the base valve assembly can include a bleed passage to control the flow of fluid during compression, and the rebound valve assembly at the piston may include a bleed passage to control the flow of fluid during rebound.

Figure 4:
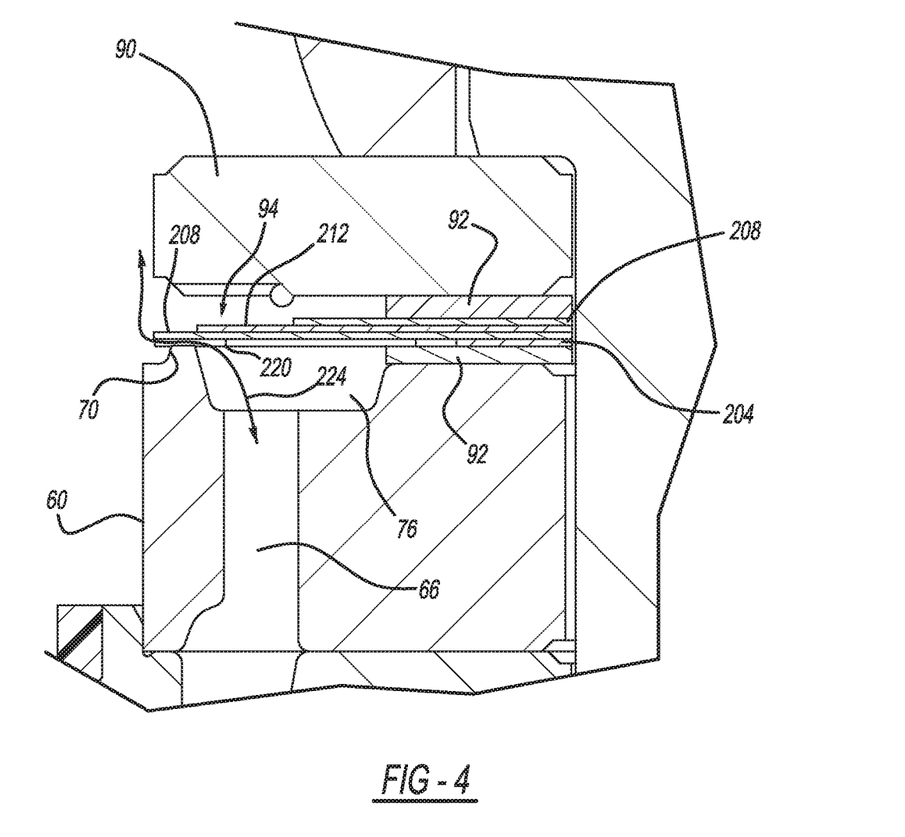
FIG. 4 is an enlarged cross-sectional view of a valve disc assembly for controlling fluid through compression passages.
Figure 5:
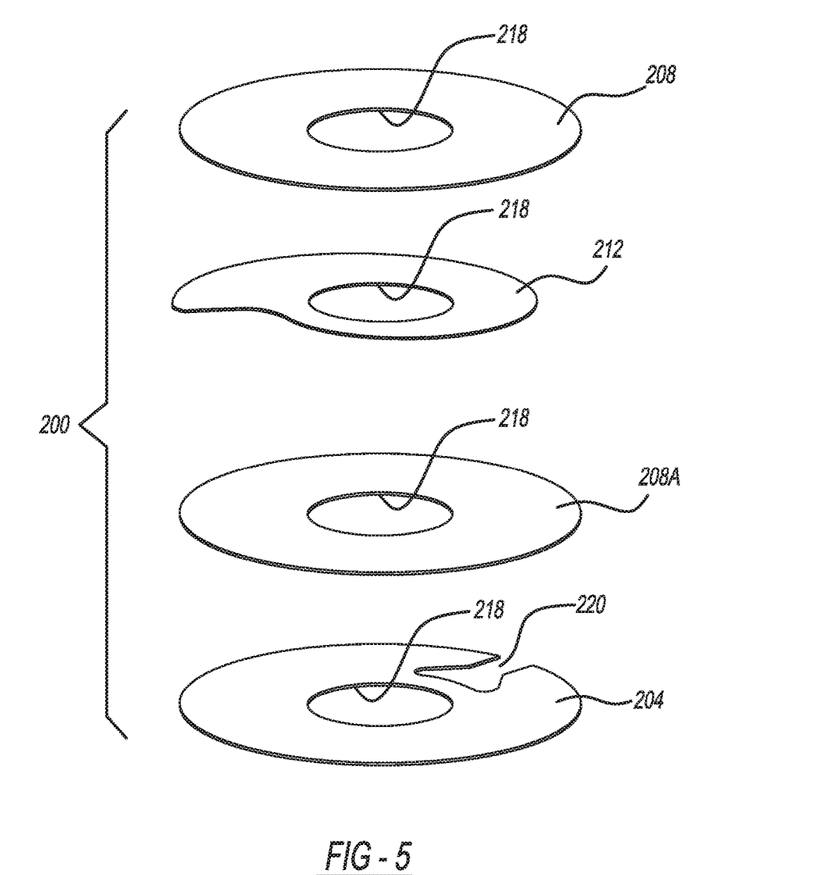
FIG. 5 is an exploded view of the valve disc assembly of FIG. 4.

Referring to FIGS. 4-5, an example of the valve disc assembly 94 of the compression valve assembly 62 is presented. The valve disc assembly 94 includes a plurality of discs 200 that control the flow of fluid between the lower working chamber 46 and the upper working chamber 44. The valve disc assembly 94 may be biased against the piston body 60 to seal the compression fluid passages 66. The valve disc assembly 94 includes an orifice disc 204, one or more solid discs 208, and a variable radius spring disc 212. The plurality of discs 200 each define a center bore 218, and are concentrically disposed with each other about the piston rod 34.

In the example embodiment, the orifice disc 204, the solid discs 208, and the variable radius spring disc 212 are positioned at the compression valve land 70 of the piston body 60 with the orifice disc 204 abutting against the compression valve land 70 of the piston body 60. Alternatively, the orifice disc 204 may be eliminated and a bleed orifice (not shown) may be disposed within the compression valve land 70. Accordingly, the solid discs 208 and the variable radius spring disc 212 may be positioned at the compression valve land 70 with one of the solid discs 208 abutting against the compression valve land 70 of the piston body 60.

The orifice disc 204 defines one or more orifices 220, and may also be referred to as a bleed disc. The orifice 220 forms a bleed passage referenced by arrow 224 for allowing fluid to flow between the upper working chamber 44 and the lower working chamber 46 at low piston speeds. The bleed passage 224 is open during compression and rebound, thereby allowing fluid to flow from the lower working chamber 46 to the upper working chamber 44, and vice versa.

A first solid disc 208A from among the one or more solid discs 208 is disposed over the orifice disc 204 to cover the orifices 220 of the orifice disc 204. In the example embodiment, the variable radius spring disc 212 is positioned after the first solid disc 208A. More particularly, the plurality of discs 200 are arranged such that one or more solid discs 208 are disposed between the orifice disc 204 and the variable radius spring disc 212. Accordingly, while the example embodiment illustrates one solid disc 208, more than one solid disc 208 may be located between the orifice disc 204 and the variable radius spring disc 212.

Figure 6:
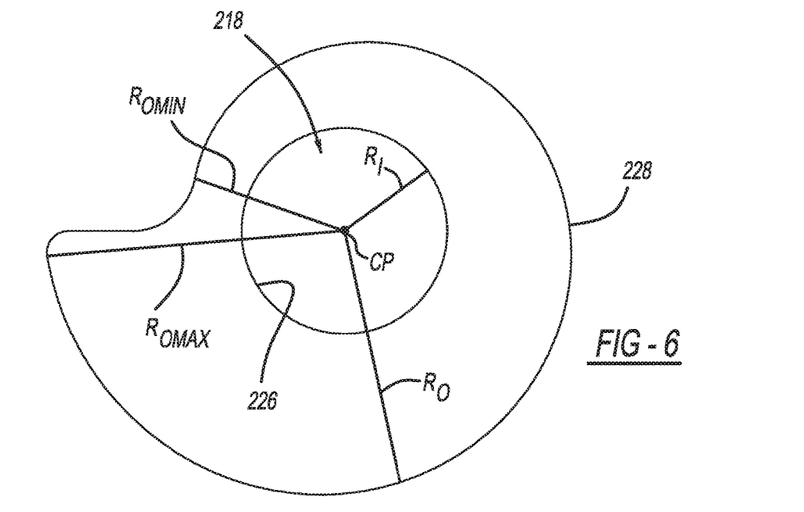
FIG. 6 is a perspective view of a variable radius spring disc of the valve disc assembly.
Figure 7:
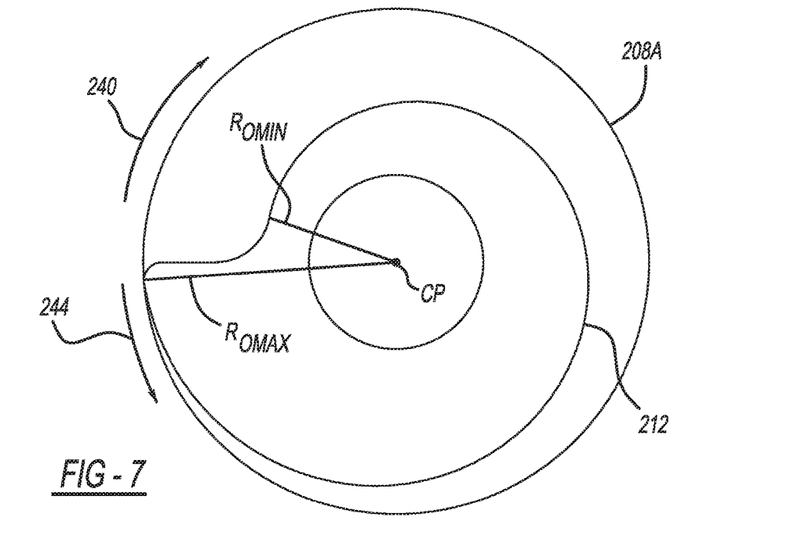
FIG. 7 is a top view of the variable radius spring disc and a solid disc.

FIGS. 6 and 7 depict the variable radius spring disc 212. The variable radius spring disc, which may also be referred to as a helical disc, has an inner radius RI and an outer radius RO. The inner radius RI is a fixed radius that extends from a center point CP to an inner perimeter 226 that defines the center bore 218. The outer radius RO extends from the center point CP to an outer perimeter 228 and varies along the outer perimeter 228. Specifically, the variable radius spring disc 212 includes a maximum outer radius ROMAX and a minimum outer radius ROMIN. The outer radius RO continuously changes between the maximum outer radius ROMAX and the minimum outer radius ROMIN such that the variable radius spring disc 212 is asymmetrical. With the varying outer radius RO, the variable radius spring disc 212 has a spiral like configuration in which the outer radius RO decreases and varies from the maximum outer radius ROMAX to the minimum outer radius ROMIN.

Similar to the valve disc assembly 94 of the compression valve assembly 62, the valve disc assembly 104 of the rebound valve assembly 64 may include the plurality of discs 200, and more particularly, the variable radius spring disc 212. While the valve disc assemblies 94 and 104 are described as having the same set of plurality of discs 200, the valve disc assemblies 94 and 104 may have a different number of discs that can be arranged in various suitable manners.

During a compression stroke, fluid in the lower working chamber 46 is pressurized and flows from the lower working chamber 46 to the compression fluid passages 66. The rebound valve assembly 64 restricts the flow of fluid through rebound fluid passages 68. At low fluid speeds, a controlled amount of fluid flows between the upper working chamber 44 and the lower working chamber 46 through the bleed passage 224 defined by the orifice disc 204.

As fluid pressure in the lower working chamber 46 increases, the fluid in the compression fluid passages 66 exerts a force against the valve disc assembly 94, such that the orifice disc 204 exerts a pressure onto the solid disc 208, and the solid disc 208 exerts a pressure onto the variable radius spring disc 212. As described in detail below, the stiffness of the valve disc assembly 94 varies in relation to the circumference of the valve disc assembly 94. Accordingly, the fluid pressure required to overcome a force associated with the stiffness varies circumferentially. When the force is exceeded, the valve disc assembly 94 deflects to allow fluid to flow past the valve disc assembly 94. Thus, fluid flows through the compression fluid passages 66 into the upper working chamber 44.

During a rebound stroke, fluid in the upper working chamber 44 is pressurized, and fluid flows from the upper working chamber 44 to the rebound fluid passages 68. The compression valve assembly 62 restricts the flow of fluid through the compression fluid passages 66 during the rebound stroke. Fluid flowing through the rebound fluid passages 68 is controlled by the rebound valve assembly 64. Prior to the deflection of the rebound valve disc assembly 104, a controlled amount of fluid flows from the lower working chamber 46 to the upper working chamber 44 through a bleed passage that provides damping at low fluid speeds. The fluid pressure within rebound fluid passages 68 eventually opens the rebound valve assembly 64 by deflecting the valve disc assembly 104.

The variable radius spring disc 212 promotes the asymmetrical (or put differently, non-symmetrical) stiffness to control the opening/closing of the valve disc assemblies 94 and 104. More particularly, by having the variable radius spring disc 212, the valve disc assemblies 94 and 104 gradually open/close in an analog wraparound manner. The operation of the variable radius spring disc 212 is described with reference to the valve disc assembly 94, and is also applicable to the valve disc assembly 104.

With reference to FIG. 7, the variable radius spring disc 212 is illustrated with the solid disc 208A, which is disposed between the variable radius spring disc 212 and the valve land 70. The surface area of the solid disc 208A that engages with the variable radius spring disc 212 varies in relation to the circumference of the variable radius spring disc 212. Accordingly, the solid disc 208A is subjected to a stiffness that varies circumferentially. As an example, sections of the solid disc 208A that align with the minimum outer radius ROMIN of the variable radius spring disc 212 require less pressure to deflect than sections of the solid disc 208A that align with the maximum outer radius ROMAX.

Accordingly, as fluid pressure increases, sections of the solid disc 208A that are not covered by the variable radius spring disc 212 begin to open. For instance, the solid disc 208A may begin to deflect along an outer perimeter of the solid disc 208A starting with an area adjacent to the minimum outer radius ROMIN of the variable radius spring disc 212. The solid disc 208A may continue to deflect toward a section adjacent to the maximum outer radius ROMAX.

As pressure continues to build, sections of the solid disc 208A that are covered with the variable radius spring disc 212 begin to open. For example, covered portions of the solid disc 208A may begin to deflect away from the piston body 60 starting with a section having the least surface area coverage by the variable radius spring disc 212 to a section that has the most surface area coverage by the variable radius spring disc 212.

The direction along which the solid disc 208A deflects during a compression or rebound stroke is represented by arrow 240. The variable radius spring disc 212 controls the deflection of the solid disc 208A such that the solid disc 208A circumferentially deflects away from the piston body 60 in a wraparound manner. More particularly, the solid disc 208A deflects along a direction that corresponds to the increasing radius of the variable radius spring disc 212.

While the wraparound deflection promoted by the variable radius spring disc 212 is described with respect to the solid disc 208A, the other discs of the valve disc assembly 94 also deflect in a similar manner. In particular, the variable radius spring disc 212 controls the opening of the valve disc assembly 94 such that the portion of the valve disc assembly 94 that aligns with the minimum outer radius ROMIN of the variable radius spring disc 212 begins to deflect away from the valve land 70 before the portion that aligns with the maximum outer radius ROMAX. Due to the spiral configuration of the variable spring disc, the amount of deflection of the valve disc assembly 94 may vary such that the portion of the valve disc assembly 94 that aligns with the minimum outer radius ROMIN may deflect more than the portion of the valve disc assembly 94 that aligns with the maximum outer radius ROMAX.

As fluid pressure in the lower working chamber 46 decreases, the force exerted against the valve disc assembly 94 by the fluid in the compression fluid passages 66 decreases. Specifically, the valve disc assembly 94 closes the compression fluid passages 66 when the force of the valve disc assembly 94 overcomes the pressure exerted by the fluid in the compression fluid passages 66. Similar to the opening of the valve disc assembly 94, the variable radius spring disc 212 controls the valve disc assembly 94 such that the discs 200 gradually close the compression fluid passages 66 in a wraparound manner. For example, as pressure reduces, the portion of the valve disc assembly 94 that aligns with the maximum outer radius ROMAX of the variable radius spring disc 212 begins to return to an un-deflected state to rest against the valve land 70 of the piston body before the portion that aligns with the minimum outer radius ROMIN. The valve disc assembly 94 continues to seal against the valve land 70 in a wraparound manner in a direction that corresponds to the decreasing radius of the variable radius spring disc 212. The direction along which the valve disc assembly 94 begins to close the compression fluid passages 66 is represented by arrow 244 in FIG. 7.

Figure 8:
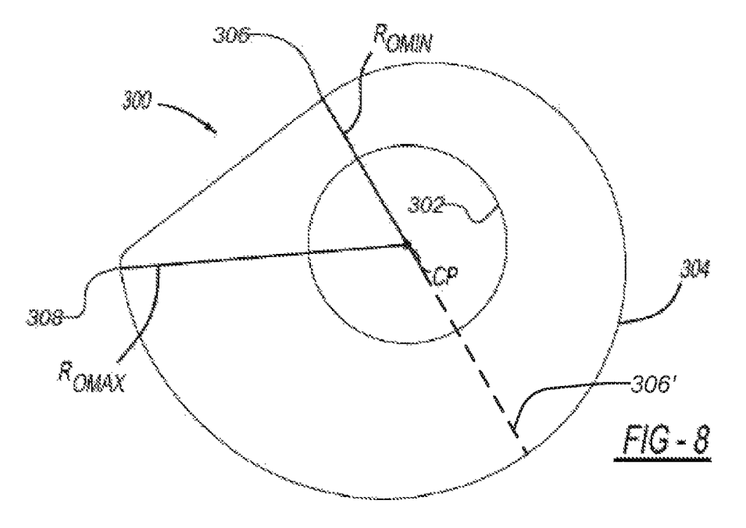
FIG. 8 is a perspective view of a variable radius spring disc in a second embodiment.
Figure 9:
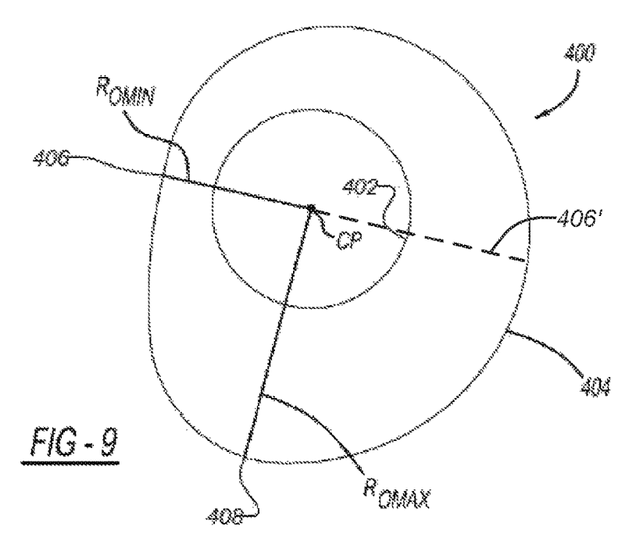
FIG. 9 is a perspective view of a variable radius spring disc in a third embodiment.

The variable radius spring disc 212 has a paisley or tear drop like shape in which the outer radius continuously varies. The variable radius spring disc may have other suitable shapes in which the outer radius varies between a maximum outer radius and a minimum outer radius. For example, FIG. 8 illustrates a variable radius spring disc 300 having a circular opening 302, and FIG. 9 illustrates a variable radius spring disc 400 having a circular opening 402 and an asymmetrical (i.e., non-symmetrical) shape. The variable radius spring disc 300 has a maximum outer radius ROMAX at a point 308 and a minimum outer radius ROMIN at a point 306. The variable radius spring disc 400 has a maximum outer radius ROMAX at a point 408 and a minimum outer radius ROMIN at point 406. The variable radius spring disc 300 has an outer perimeter 304, and the variable radius spring disc 400 has an outer perimeter 404. The variable radius spring discs 300 and 400 perform in a similar manner to the variable radius spring disc 212 as described herein. The radii of each of the variable radius spring discs 300 and 400 increase continuously from the ROMIN point (point 306 or 406) to the ROMAX point (point 308 or 408). With both of the variable radius spring discs 300 and 400, it will be noted that the distance from the point ROMIN to ROMAX covers an angular arc greater than 180 degrees, which points are designated by dashed lines 306' and 406'. With the variable radius spring discs 300 and 400 the arcs each span slightly over 270 degrees.

The variable radius spring disc promotes an analog opening/closing of the valve disc assembly 94 and not a digital opening/closing in which the discs move all at once to fully open or fully close the flow of fluid between the lower working chamber 46 and the upper working chamber 44. By having an analog opening/closing, the damping characteristic of the shock absorber can be controlled between low speed and high speed operations, thereby improving the steering and handling of the vehicle. Furthermore, the gradual wrap around opening/closing of the valve disc assembly 94 prevents the discs 200 from blowing off or returning all at once, thereby improving noise, harshness, and vibration qualities of the shock absorber.

While the variable radius spring disc is described as being part of the valve disc assembly for both the compression valve assembly and the rebound valve assembly, the variable radius spring disc can provide for one valve assembly and not the other valve assembly. In addition, the variable radius spring disc may also be included in a base valve assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

When an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship, to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations), and the spatially relative descriptors used herein interpreted accordingly.

What is claimed is:

1. A shock absorber for a vehicle comprising:
a pressure tube defining a fluid chamber;
a piston rod disposed within the pressure tube;
a piston disposed within the fluid chamber and carried on the piston rod, the piston dividing the fluid chamber into an upper working chamber and a lower working chamber, the piston defining a plurality of passages extending through the piston between the upper working chamber and the lower working chamber; and
a valve disc assembly for controlling a flow of fluid within the shock absorber,
the valve disc assembly disposed within the pressure tube and including a spring disc, wherein the spring disc has a non-symmetrical shape which enables a stiffness of the valve disc assembly to be tailored so that the valve disc assembly begins to open at a first peripheral point, and continuously gradually opens about a non-symmetrical circumferential path defined by a periphery of the spring disc, until reaching a second peripheral point, wherein the spring disc includes a first outer radius at the first peripheral point, wherein the outer radius increases continuously and circumferentially from the first peripheral point to the second peripheral point along an outer perimeter of the variable radius spring disc, wherein the first peripheral point is circumferentially spaced apart from the second peripheral point by an angle greater than 180 degrees.

2. The shock absorber of claim 1 wherein the spring disc has an eccentrically positioned opening.

3. The shock absorber of claim 1 wherein the spring disc has a maximum outer radius and a minimum outer radius, the maximum outer radius being at the second peripheral point and the minimum outer radius being at the first peripheral point.

4. The shock absorber of claim 1 wherein:
the valve disc assembly includes a plurality of discs includes an orifice disc and one or more solid discs, and
the plurality of discs are arranged such that at least one of the one or more solid discs is disposed between the orifice disc and the spring disc.

5. The shock absorber of claim 1 wherein:
the valve disc assembly includes a plurality of discs and the valve disc assembly is disposed on the piston;
wherein the valve disc assembly actuates gradually away from the piston along the non-symmetrical circumferential path, and actuates gradually toward the piston along the non-symmetrical circumferential path.

6. The shock absorber of claim 1 wherein:
the piston includes a support land that circumferentially extends along a surface of the piston, and
the valve disc assembly further includes a plurality of discs including an orifice disc and one or more solid discs, the plurality of discs being disposed at the support land and arranged such that the orifice disc is disposed on the support land and at least one of the one or more solid discs is disposed between the orifice disc and the spring disc.

7. The shock absorber of claim 1 wherein:
the valve disc assembly is operably associated with the piston, and the valve disc assembly initially deflecting away from the piston at the first peripheral point where a stiffness of the valve disc assembly is at a minimum, along a first direction corresponding to the non-symmetrical circumferential path, that corresponds to an increasing stiffness of the valve disc assembly as fluid pressure increases in the plurality of passages, and
the valve disc assembly actuates to gradually seal the plurality of passages along a second direction corresponding to the non-symmetrical circumferential path, that corresponds to a decrease in the stiffness of the valve disc assembly as fluid pressure decreases in the plurality of passages.

8. The shock absorber of claim 1, wherein the non-symmetrical circumferential path comprises an arc of more than 270 degrees.

9. A shock absorber for a vehicle comprising:
a pressure tube defining a fluid chamber;
a piston rod disposed within the pressure tube;
a piston disposed within the fluid chamber and carried on the piston rod, the piston dividing the fluid chamber into an upper working chamber and a lower working chamber, the piston defining a plurality of passages extending through the piston between the upper working chamber and the lower working chamber; and
a valve disc assembly for controlling a flow of fluid within the shock absorber, the valve disc assembly including a spring disc;
the valve disc assembly disposed within the pressure tube and cooperating with a land of a flow control component to control a fluid flow within the shock absorber, wherein the valve disc assembly cooperates with the land to control opening of the valve disc assembly so that the valve disc assembly begins to open at a first peripheral point, and gradually continuously opens about a non-symmetrical circumferential path having an increasing radius and extending more than 180 degrees, until reaching a second peripheral point spaced from the first peripheral point.

\* \* \* \* \*